United States Patent [19]
Hollick

[11] Patent Number: 6,042,430
[45] Date of Patent: Mar. 28, 2000

[54] FASTENER

[75] Inventor: David John Hollick, Chinnor, United Kingdom

[73] Assignee: B & H (Nottingham) Limited, United Kingdom

[21] Appl. No.: 08/930,925

[22] PCT Filed: Apr. 2, 1996

[86] PCT No.: PCT/GB96/00792

§ 371 Date: Oct. 3, 1997

§ 102(e) Date: Oct. 3, 1997

[87] PCT Pub. No.: WO96/31706

PCT Pub. Date: Oct. 10, 1996

[30] Foreign Application Priority Data

Apr. 7, 1995 [GB] United Kingdom .................... 9507240

[51] Int. Cl.[7] .................................................. H01R 11/09
[52] U.S. Cl. ............................ 439/797; 411/5; 411/309; 439/814
[58] Field of Search .................................. 439/797, 813, 439/814, 810; 411/5, 307, 308, 309, 263

[56] References Cited

U.S. PATENT DOCUMENTS

| 2,842,180 | 7/1958 | Brown et al. ............................ 411/307 |
| 3,865,007 | 2/1975 | Starback ................................. 439/814 |
| 3,876,279 | 4/1975 | Underwood ............................. 439/797 |
| 4,199,216 | 4/1980 | Gryctko ................................... 439/814 |

FOREIGN PATENT DOCUMENTS

| 2266628 | 11/1993 | United Kingdom . |
| 2281599 | 3/1995 | United Kingdom . |

*Primary Examiner*—Neil Abrams
*Assistant Examiner*—T. C. Patel
*Attorney, Agent, or Firm*—Young & Basile, P.C

[57] ABSTRACT

A shearable fastener has a threaded shank (10) adapted for engagement with a threaded bore and a head (12) formed for engagement with a drive tool. The shank (10) is formed with a series of axially separated weakenings (14) defining a series of shear planes, the weakenings (14) being formed such that the applied torque necessary to cause the shank (10) to shear increases progressively from the shear plane (14) furthest from the head (12) to the shear plane (14) nearest the head (12).

19 Claims, 3 Drawing Sheets

FASTENER

BACKGROUND OF THE INVENTION

This invention relates to improvements in fasteners, in particular to improvements in shearable fasteners. Such fasteners are particularly suitable for securing electrical conductors to electrical connectors.

Electrical connectors are widely used for the jointing of two or more electrical cables or conductors. One form of such connector comprises a body with blind bores into which the ends of the conductors are inserted. Each conductor is fixed in place by threaded fasteners which are engaged with threaded bores in the wall of the blind bore and which hold the conductor against the opposite internal face of the bore. Commonly, Such fasteners have shearable heads which break off at a certain predetermined applied torque. This prevents excessive and possibly damaging, force being applied to the conductor and also results in the assembled joint having a reasonably smooth profile.

Known systems of the type described above suffer from the disadvantage, however that because the conductors joined together using the connector may take various different sizes it is necessary for the shearable fasteners to be produced in a corresponding range of lengths in order to ensure that the assembled joint has the desired smooth profile. This means that a fitter must carry a suitable supply of all different sizes and can result in mistakes being made and inappropriate fasteners being used.

British Patent Application No GB 2281599 describes a threaded fastener which, when applied using a special tool, is arranged to shear at an axial position along its length corresponding to the surface of an electrical connector with which it is engaged. However, such a fastener can only be used in conjunction with such a special tool.

There has now been devised an improved fastener, of particular use in securing an electrical conductor to an electrical connector, which overcomes or substantially mitigates the above mentioned disadvantage.

SUMMARY OF THE INVENTION

According, to the invention, there is provided a shearable fastener having a threaded shank adapted for engagement with a threaded bore and a head portion formed for engagement with a drive tool, the shank being formed with a series of axially separated weakenings defining a series of shear planes, wherein the weakenings are formed such that the applied torque necessary to cause the shank to shear increases progressively from the shear plane furthest from the head portion to the shear plane nearest the head portion.

The fastener according to the invention is advantageous primarily in that as the fastener is engaged with the threaded bore the shear planes enter the threaded bore in succession. As the thread on either side of each shear plane on the shank engages with the threaded bore, that shear plane becomes supported and this increases the torque required to shear the fastener at that point. When rotation of the fastener is prevented, the fastener will shear at either the shear plane immediately external to the threaded bore or at a partially supported shear plane within but immediately adjacent to the external end of the threaded bore, depending on which requires the lower shear torque. In either case, the fastener will shear substantially flush with the external end of the threaded bore with a minimal length of shank standing proud of the threaded bore. Thus, the same fastener can be used for securing conductors of differing diameter. No special tools are required to ensure that the shank of the fastener shears at the desired shear plane. The drive tool may, for example, be a conventional spanner or socket wrench, since the drive tool plays no part in determining the plane in which the shank of the fastener shears.

According to a further aspect of the invention, there is provided an electrical connector comprising first and second connector parts between which an electrical conductor may be received, and a threaded fastener engageable with a threaded bore in the first connector part such that the fastener may engage the conductor, either directly or through intermediate components, and secure the conductor against the second connector part, the fastener having a threaded shank adapted for engagement with the threaded bore and a head portion formed for engagement with a drive tool, the shank being formed with a series of axially separated weakenings defining a series of shear planes, wherein the weakenings are formed such that the applied torque necessary to cause the shank to shear increases progressively from the shear plane furthest from the head portion to the shear plane nearest the head portion. The first connector part and the second connector part may be separate components held in fixed relation, or may be formed integrally, eg as opposite sides of a tubular socket into which the conductor is inserted.

The fastener may bear directly on the conductor. Alternatively, the fastener may drive one or more intermediate components, eg a pressure plate or an insulation piercing member, into engagement with the conductor.

The connector may contain a plurality of sockets for the connection together of a corresponding number of conductors (eg two or three conductors). Alternatively, the connector may have only a single socket and be for the connection of a single conductor to some other component. In a further alternative, a socket may receive more than one conductor.

Each conductor may be secured by a single fastener or by more than one, eg two, fasteners. Where there is more than one fastener, the threaded bores for the fasteners may be parallel and adjacent, or may have some other arrangement. For example, where the first and second connector part are opposite sides of a socket, each side may have one or more threaded bores for fasteners which secure the conductor to the opposite side of the socket.

The external surface of the connector may be curved or flat, but in either case the threaded bore is preferably countersunk, such that shearing preferentially takes place at a point below the outer surface of the connector. The spacing of the weakenings on the fastener shank is preferably such that at least one weakening is positioned within the countersink whenever the fastener engages a conductor.

In principle, any form of drive means may be used to rotate the fastener, but preferably the head portion of the fastener may have a head of non-circular form, eg a square or hexagonal head, such that positive drive may be transmitted to the fastener using a suitable tool such as a socket wrench. Alternatively, the head portion of the fastener may be formed with a bore or recess, eg of hexagonal or square section, with which an Allen key or the like may be engaged. In such a case the bore or recess need not extend far along the axis of the fastener. However, if the bore or recess does extend a substantial distance along the axis of the fastener, the drive tool should not extend into the recess or bore so far that it supports internally any of the weakenings which define the shear planes.

In a further alternative, the means by which the drive tool is engageable with the fastener may comprise one or more transverse bores or recesses. In such a case, the head portion of the fastener may simply be a terminal region of the shank.

The weakenings in the fastener shank preferably comprise holes, grooves or slits formed in the side of the fastener. The progressive variation in the applied torque necessary to cause shearing can be achieved by control of the dimensions (width, depth) of the holes, grooves or slits constituting the weakenings.

In a particularly preferred embodiment, the weakenings in the shank comprise a series of axially separated annular grooves. The depth of the grooves decreases from that nearest the tip of the shank to that nearest the head portion. In this arrangement, in the successive shear planes defined by the grooves, the effective diameter of the shank increases progressively from the tip of the shank to the head portion. Hence, the applied torque necessary to cause shearing increases from the tip of the shank to the head portion.

Because smaller diameter conductors are less robust than large diameter conductors, it may be desirable for the clamping force exerted by the fastener on a smaller conductor to be less than in the case of a larger conductor. Preferably, therefore, the fastener is formed such that the frictional back loading increases the further the fastener is engaged with the threaded bore. This can be achieved, for example, by tapering the shank such that there is a slight increase in diameter of the shank from the tip to the head. Alternatively, the depth of the thread may be progressively slightly reduced as the thread approaches the head. In other embodiments the thread may be imperfectly formed in the region close to the head so that the friction increases as the shank is further engaged with the threaded bore.

BRIEF DESCRIPTION OF THE DRAWINGS

The invention will now be described in greater detail, by way of illustration only, with reference to the accompanying drawings, in which.

DESCRIPTION OF THE PREFERRED EMBODIMENT

Figure 1:
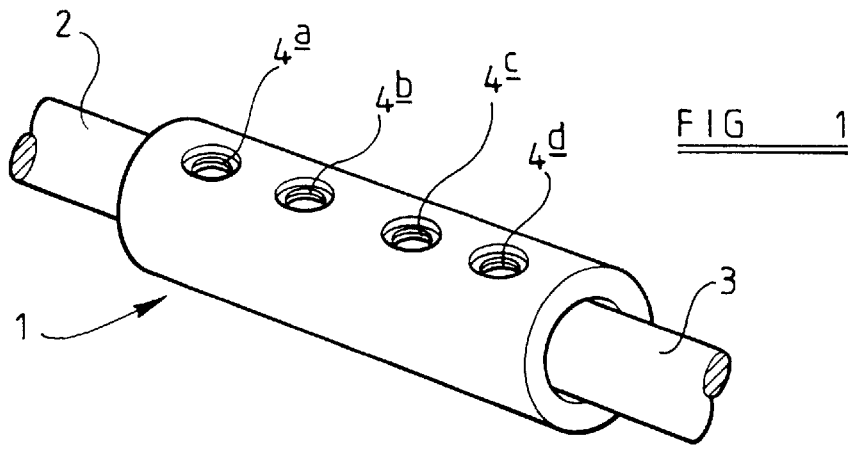
FIG. 1 is a perspective view of a first electrical connector for the end-to-end connection of two electrical conductors.

Referring first to FIG. 1, an electrical connector comprises a generally cylindrical aluminium body 1. Blind bores extend from each end of the body 1 towards the middle, each bore receiving the end of respective first and second conductors 2,3. Four threaded bores 4a–d are provided in the wall of the body 1. The threaded bores 4a–d receive shearable threaded fasteners (not shown in FIG. 1) which engage the conductors 2,3 and hold them in position within the blind bores in the body 1. Fasteners passing through the threaded bores 4a,4b engage the first conductor 2 and fasteners passing through the threaded bores 4c,4d engage the second conductor 3. The connector thus far described is entirely conventional.

Figure 2:
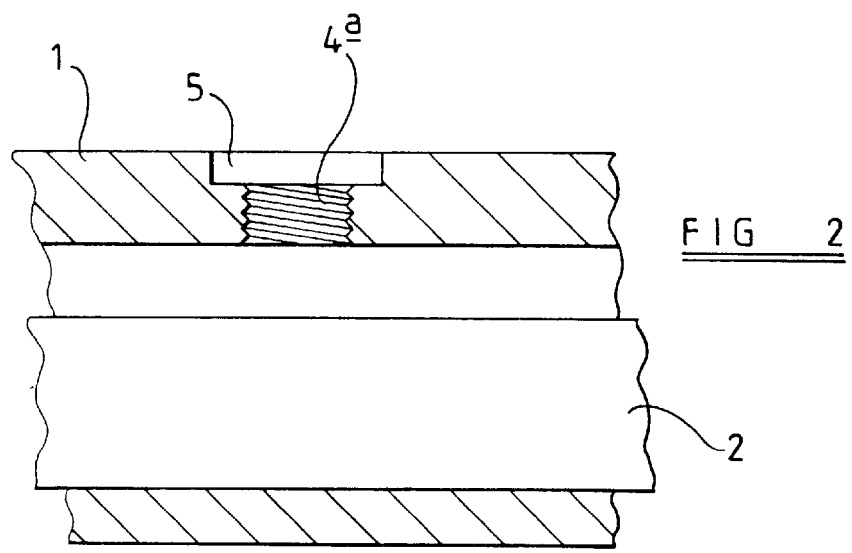
FIG. 2 is a sectional view of a portion of the connector of FIG. 1.

FIG. 2 shows a sectional view of the connector body 1 in the region of the threaded bore 4a.

As can be seen, the upper portion of the bore 4a is provided with a countersink 5.

Figure 3:
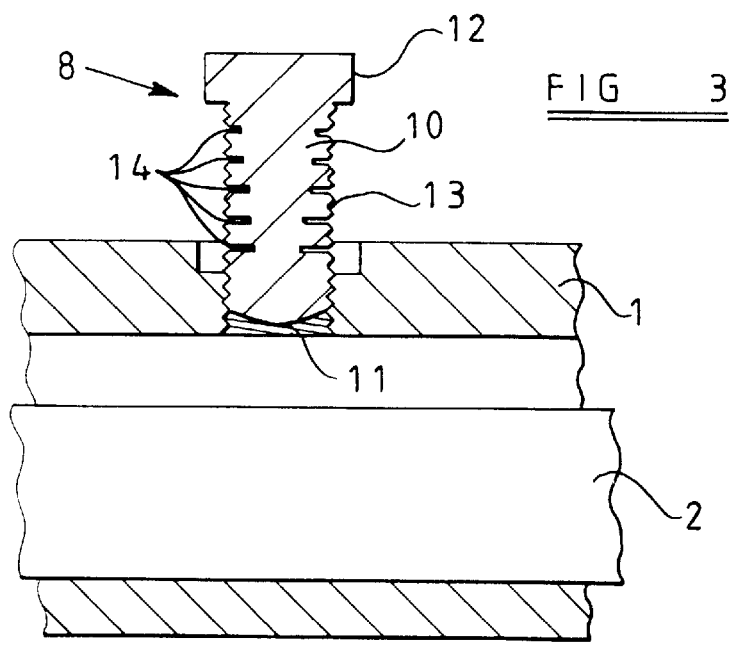
FIG. 3 shows the same portion of the connector of FIG. 1, with a shearable threaded fastener according to the invention engaged with the connector.

In use, shearable threaded fasteners 8 (see FIG. 3) are engaged with the threaded bore 4a, and with the other three threaded bores 4b–d. As shown in FIG. 3, the fastener 8 has a generally cylindrical shank 10 with a tip 11 formed into an obtuse point. The fastener 8 has a head 12 of non-circular form, preferably a hexagonal cross section 18 or square cross-section 19. The cylindrical outer surface of the shank 10 is formed with a screw thread 13 and, superimposed on the thread, a series of spaced apart circumferential slits 14 which extend radially into the shank 10. The slits 14 are arranged and disposed to cause shearing of the shank 10 upon application of certain predetermined torques. The depth of the slits 14 increases progressively from the head 12 of the fastener 8 towards the tip 11, such that the torque necessary to cause shearing of the shank 10 increases with distance from the tip 11.

Figure 4:
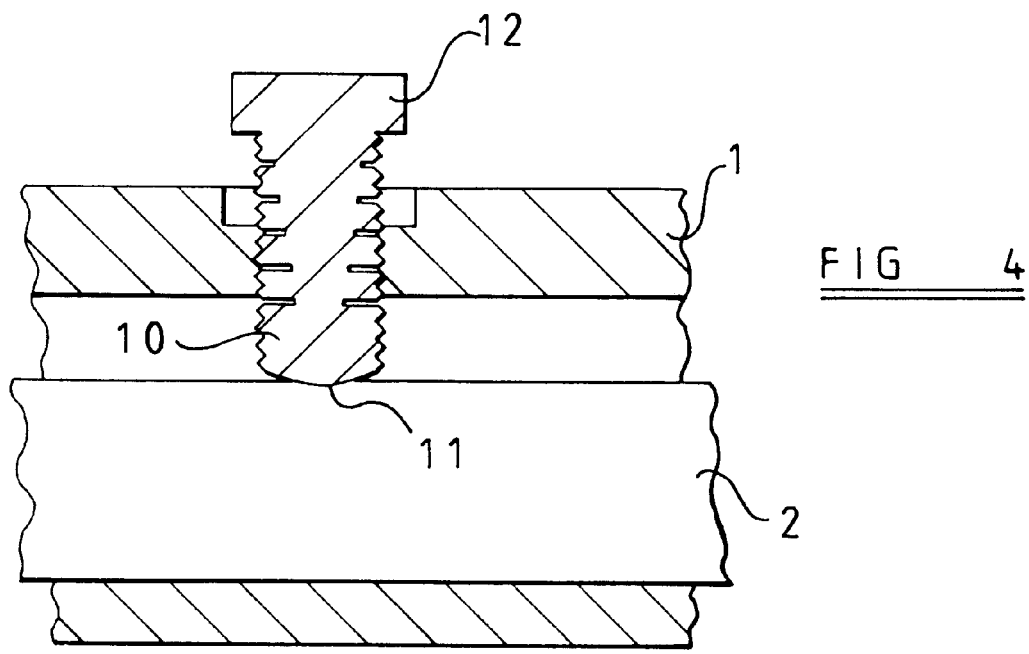
FIG. 4 is a view similar to FIG. 3, after sufficient rotations of the shearable fastener for it to engage a conductor within the connector.

The fastener 8 is engaged with the threaded bore 4a using a conventional drive tool such as a socket wrench which engages the head 12. Alternatively, the head 12 of the fastener may be formed with a bore or recess 16, e.g. a hexagonal or square section, with which an Allen key or the like may be engaged. For clarity, the drive tool is not shown in the drawings. The fastener 8 is rotated until its tip 11 engages the conductor 2 (see FIGS. 3 and 4).

Figure 5:
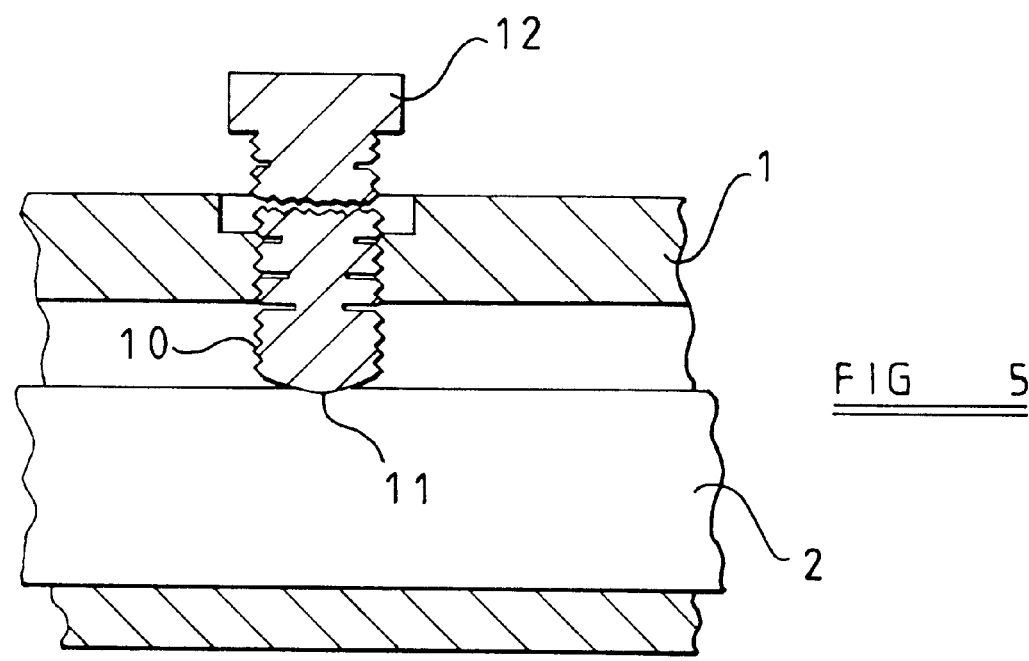
FIG. 5 illustrates shearing of the shearable fastener following continued application of torque to the fastener.
Figure 6:
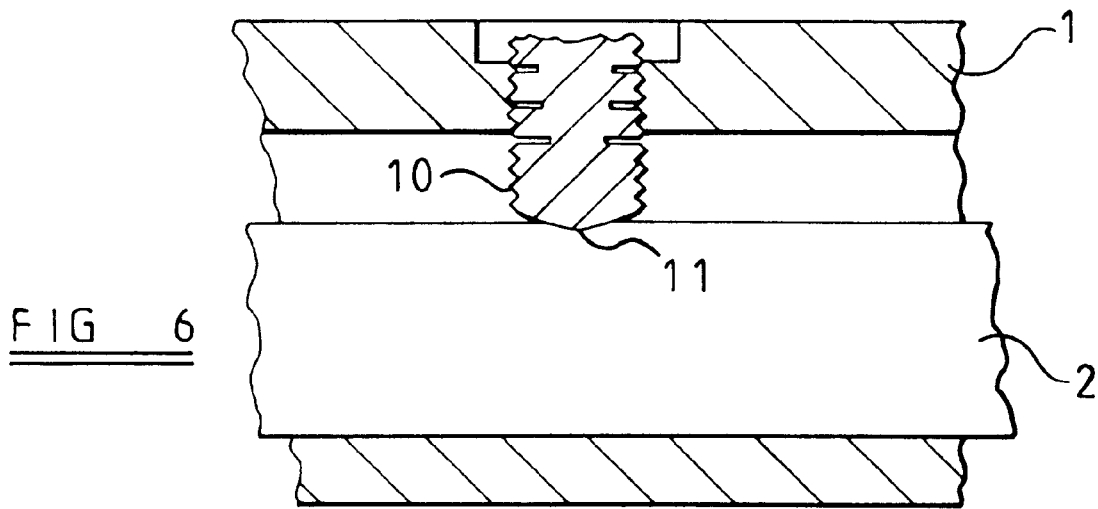
FIG. 6 shows the sheared fastener holding the conductor in position.

Continued application of torque to the fastener 8 causes the fastener 8 to shear, as shown in FIG. 5. Because the lower portions of the fastener 8 are supported externally by the walls of the threaded bore 4a, and because the applied torque necessary to cause shearing increases with distance from the tip 11, the shank 10 shears preferentially at the first slit 14 which is external to the threaded bore 4a. This slit will generally be in the countersink 5 of the bore 4a. Occasionally, however, the fastener may shear at a slit 14 located just internal to the threaded bore 4a. After shearing of the fastener 8, the remaining lower portion of the fastener 8 holds the conductor 2 securely in place (see FIG. 6).

In the case of a conductor of larger diameter than that shown in the drawings, the fastener 8 would extend a shorter distance into the connector bore before engaging the conductor. In this case shearing would take place at a slit 14 nearer the tip 11 of the fastener 8. Because smaller conductors are less robust than larger conductors, it may be desirable for a lesser securing force to be applied to such a conductor. For this reason, the depth of the thread 13 is reduced slightly towards the head 12. This increases the frictional back-loading as the fastener 8 is progressively engaged with the threaded bore 4a, resulting in a reduced clamping force the further the shank 10 is engaged with the threaded bore 4a.

Figure 7:
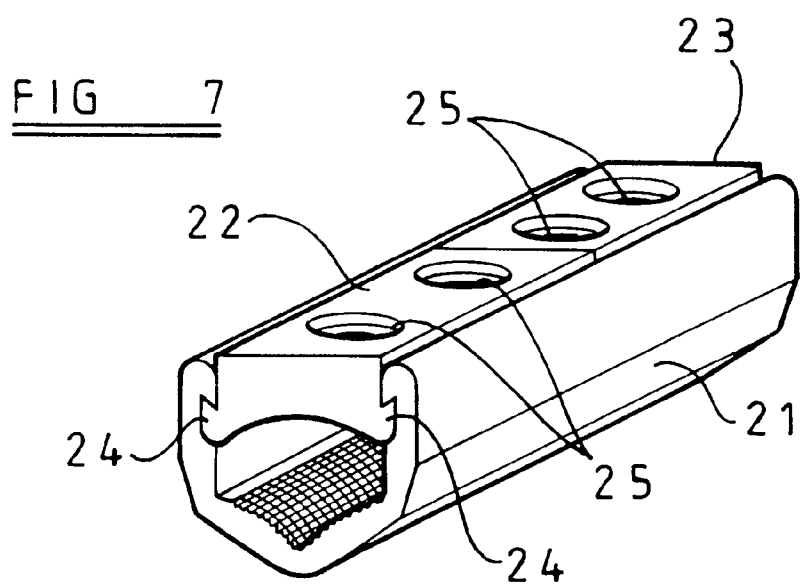
FIG. 7 is a perspective view of a second form of electrical connector for the end-to-end connection of two electrical conductors.

FIG. 7 shows a second form of electrical connector with which shearable bolts according to the invention may be used. This connector is intended primarily for low-voltage applications and comprises a connector body 21 of channel cross-section. The upper part of the body 21 is closed by a pair of closure members 22,23, the sides of which have retaining formations 24 which engage corresponding grooves in the body 21. Each of the closure members 22,23 has a pair of threaded bores 25 with which shearable threaded fasteners such as those described above may be engaged. The connector is used in a similar fashion to the first connector described above.

In FIGS. 3 to 6, the differences in the dimensions of the slits 14 is exaggerated for clarity. In practice, the differences in the depth of the slits 14 may be only slight, and may not be apparent to the naked eye. In one practical embodiment, the fastener 8 is of brass and has a shank 10 of nominal diameter 18 mm. The fastener 8 has an overall length of 41 mm, the lowermost slit 14 being 12.25 mm from the tip 11 of the fastener 8. The slits 14 are separated axially at 3.75 mm centres and are all 0.75 mm wide.

The slit 14 closest to the tip 11 has a depth of approximately 5 mm such that in the plane defined by that slit the shank 10 has an effective diameter of approximately 8 mm. The shank 10 is found to shear in that plane at an applied torque of approximately 26–30 ft.lbs. The four succeeding slits 14 have depths which are successively reduced by 0.05 mm (ie the effective diameter of the shank 10 increases by 0.1 mm from one shear plane to the next). This leads to an increase in the torque at which the shank 10 will shear by approximately 2 ft.lbs from one shear plane to the next.

I claim:

1. A shearable fastener comprising: a threaded shank adapted for engagement with a threaded bore; a head portion formed for engagement with a drive tool; and means for defining a series of shear planes on the shank, said means for defining a series of shear planes including a series of axially separated weakenings; wherein the weakenings are formed such that the applied torque necessary to cause the shank to shear increases progressively from the shear plane furthest from the head portion to the shear plane nearest the head portion when said fastener is engaged with said threaded bore.

2. A fastener as claimed in claim 1, wherein the weakenings comprise holes, grooves or slits formed in the shank.

3. A fastener as claimed in claim 1, wherein the weakenings comprise annular grooves, the depth of the grooves decreasing from that furthest from the head portion to that nearest the head portion.

4. A fastener as claim in claim 1, having a configuration such that the frictional back-loading between the shank and a threaded bore with which it is engaged increases the further the shank is engaged with the threaded bore.

5. A fastener as claimed in claim 4, wherein the diameter of the shank increases from the tip of the shank to the head portion.

6. A fastener as claimed in claim 4, wherein the shank is formed with a thread, the depth of the thread being progressively reduced as the thread approaches the head portion.

7. A fastener as claimed in claim 1, wherein the head portion is of non-circular cross-section.

8. A fastener as claimed in claim 7, wherein the head portion is one of a square and hexagonal cross-section.

9. A fastener as claimed in claim 1, wherein the head portion is formed with a recess of non-circular cross-section.

10. An electrical connector comprising first and second connector parts between which an electrical conductor may be received, and a threaded fastener engageable with a threaded bore in the first connector part such that the fastener may engage the conductor, either directly or through intermediate components, and secure the conductor against the second conductor part, the fastener being as claimed in claim 1.

11. A connector as claimed in claim 10, wherein a plurality of threaded bores are provided for a corresponding number of threaded fasteners to engage the conductor.

12. A connector as claim in claim 10, wherein the first connector part and the second connector part are separate components held in fixed relation.

13. A connector as claimed in claim 10, wherein the first connector part and the second connector part are formed integrally.

14. A connector as claimed in claim 10, wherein at least one fastener bears directly on the conductor.

15. A connector as claimed in claim 10, wherein at least one fastener drives one or more intermediate components into engagement with the conductor.

16. A connector as claimed in claim 10, which comprises a plurality of sockets for the connection of a corresponding number of conductors.

17. A connector as claimed in claim 10, which comprises a single socket.

18. A connector as claimed in claim 10, wherein at least one threaded bore is countersunk.

19. A fastener as claimed in claim 1, wherein the shank has a solid cross-section.

* * * * *